United States Patent
Maeda et al.

(10) Patent No.: US 6,628,599 B2
(45) Date of Patent: Sep. 30, 2003

(54) VARIABLE OPTICAL ELEMENT, A PICKUP APPARATUS HAVING THE VARIABLE OPTICAL ELEMENT, AND AN INFORMATION RECORDING AND REPRODUCING APPARATUS HAVING THE PICKUP APPARATUS

(75) Inventors: Takanori Maeda, Tsurugashima (JP); Hiroyuki Ota, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 313 days.

(21) Appl. No.: 09/739,646

(22) Filed: Dec. 20, 2000

(65) Prior Publication Data

US 2001/0007549 A1 Jul. 12, 2001

(30) Foreign Application Priority Data

Dec. 28, 1999 (JP) ............................. 11-375170

(51) Int. Cl.[7] ................................. G11B 7/00
(52) U.S. Cl. ............................ 369/112.01; 369/112.02; 369/112.05
(58) Field of Search ................. 369/112.01, 112.03, 369/112.05, 112.06, 112.22, 44.23, 44.24

(56) References Cited

U.S. PATENT DOCUMENTS 6,137,764 A * 10/2000 Tsuchiya et al. ....... 369/112.05

* cited by examiner

*Primary Examiner*—Nabil Hindi
(74) *Attorney, Agent, or Firm*—Morgan, Lewis & Bockius LLP

(57) ABSTRACT

An information recording/reproducing apparatus of the invention is equipped with an objective lens, a light source and a variable optical element having a grating which demonstrates a piezo-electric effect by means of an electric field. The light source emits and irradiates a laser beam onto the grating to generate a 0th order diffraction beam and +/− 1st order diffraction beams in accordance with first order diffraction efficiency, and the objective lens converges the 0th diffraction beam and +/− 1st order diffraction beams which are irradiated onto an information recording medium for the purpose of information recording or information reproducing. By controlling an electric field applied to the grating, the first order diffraction efficiency of the grating is adjusted, whereby light beams are generated which have power levels appropriate for various kinds of information recording media.

8 Claims, 12 Drawing Sheets

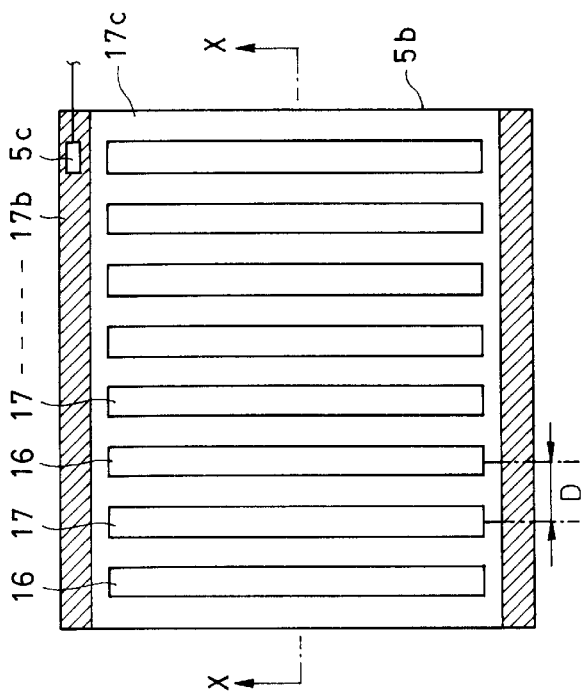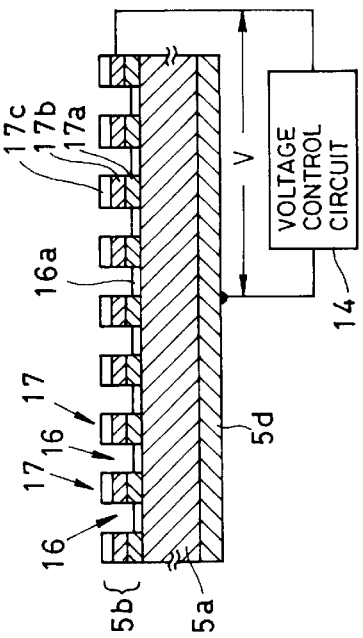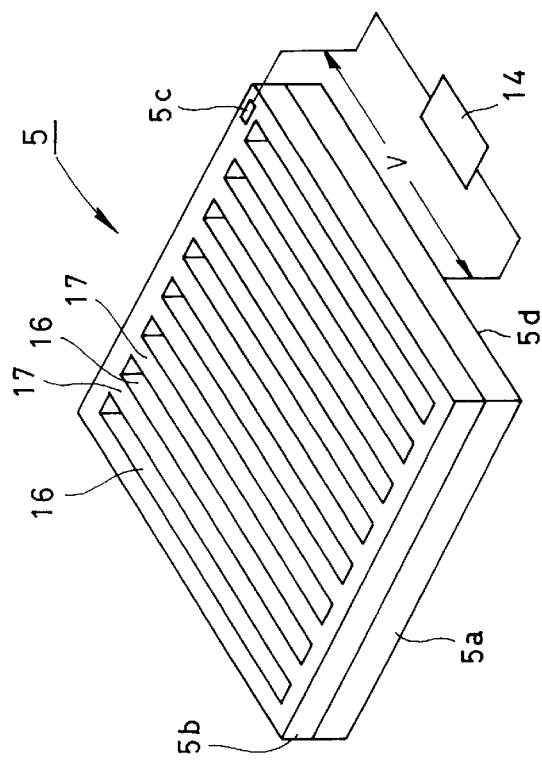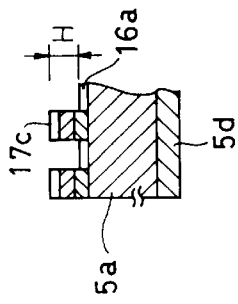

VARIABLE OPTICAL ELEMENT, A PICKUP APPARATUS HAVING THE VARIABLE OPTICAL ELEMENT, AND AN INFORMATION RECORDING AND REPRODUCING APPARATUS HAVING THE PICKUP APPARATUS

BACKGROUND OF THE INVENTION

1. Field of the Invention

The present invention relates to a variable optical element that is capable of, for example, altering optical characteristics such as diffraction efficiency, a pickup apparatus that comprises the variable optical element, and an information recording and reproducing apparatus that comprises the pickup apparatus to carry out the recording of information to and reproduction from information recording media.

2. Description of the Related Art

In recent years, information recording media having recordable properties other than information recording media having reproduction-only properties and of a phase-change type have received attention as high-density and large-capacity information recording media. Among the phase-change type information recording media, write-once optical discs that allow one-time recording of information and rewritable optical discs that allow erasing and rewriting of information have been received attention.

These phase-change type information recording media have a layered structure, as shown in the sectional view of, for example, comprising a light-incident layer onto which a light beam is made incident from an objective lens provided in a so-called pickup apparatus, a recording layer of a crystal or amorphous material protected by a protection layer, a reflective layer, and a substrate, and are so configured that information is recorded by effecting phase changes to the recording layer by the light energy of a light beam. Reproduction of information is carried out by first irradiating a light beam onto the recording layer, which reflects the beam, then converging rays of reflected light with the objective lens, and finally detecting the reflected light with a photodetector of the pickup apparatus.

Write-once optical discs have a characteristic whereby they are capable of recording information only once, which is provided for by having a recording layer whose phase is changed (an irreversible change) according to light energy. Erasable optical discs have a characteristic whereby they are capable of rewriting information, which is provided for by having a recording layer whose phase is changed (a reversible change) according to light energy. In addition, the recording density of these information recording media are increased by narrowing the track pitch of the recording layer and further increases in recording capacity are rendered by adding more recording layers.

It is considered, on the other hand, that a light beam of a smaller focused spot diameter is irradiated onto a recording layer by using a greater numerical aperture (NA) of an objective lens provided in a pickup apparatus in order to realize an information recording/rewriting apparatus that keeps pace with the above mentioned high-density information recording media.

However, while increasing the numerical aperture (NA) of the objective lens corresponding to narrower track pitches of information recording media, it is important to carry out high-density information recording and appropriate information reproduction within the limited range of the numerical aperture (NA) of the objective lens. As a response to this problem, attention has been given to the usefulness of applying a crosstalk cancellation technique when reproducing information.

A crosstalk cancellation technique is such that not only a light beam is (referred to as the main beam) irradiated onto a track in which information is recorded (referred to as the main track) to read the information from it but also light beams (referred to as the sub-beams) are irradiated onto the tracks next to the main track (referred to as the adjacent tracks) to read information from them as well, whereupon by executing a predetermined calculation based upon the main signal obtained from the main beam and the sub-signals obtained from the sub-beams, a crosstalk component contained in the main signal is controlled to reproduce information with a good accuracy.

In addition, a method is considered to diffract a laser beam emitted from a laser light source with the use of a diffraction grating in order to generate the above mentioned main beam and sub-beams, and thereby irradiate the 0th order light as the main beam and +/− 1st order light as the sub-beams onto each corresponding track through an objective lens.

However, while above mentioned crosstalk canceling technique is applied to the reproduction of information from a reproduction-only information recording medium such as a DVD-ROM (digital versatile disc read only memory), which proves effective in reproducing information with good accuracy, if it is applied to the reproduction of information recorded on a phase-change type information recording medium such as a DVD-RW (digital versatile disc rewritable), it poses problems as described below.

In the case of a phase-change type information recording medium, the phase of the recording layer alters corresponding to the amount of light energy exerted. For this reason a problem is caused where, when reproducing information from a phase-change type information recording medium, irradiating the above mentioned main beam and sub-beams used for a reproduction-only information recording medium against the corresponding main track and sub-tracks of the phase-change type information recording medium imparts phase changes to the recording layer of the main track and/or sub-tracks to erase or destroy information that was recorded. In other words, a problem occurs where, if the same light beam is applied to both a reproduction-only information recording medium and a phase-change type information recording medium, it is suitable for one type of information recording medium but not suitable for the other type of information recording medium.

To avoid such a problem, a method can be considered to adjust the light energy levels of the main beam and sub-beams, by replacing the diffraction grating with another having a different diffraction efficiency for each particular case, depending on whether information is recorded to a phase-change type information recording medium, or information is reproduced from a phase-change type information recording medium, or where information is reproduced from a reproduction-only information recording medium which is not of a phase-change type. However, this method will give way to a problem in which a rather large-scale mechanism is required to replace one diffraction grating with another.

In addition, replacing the grating causes another problem where optical characteristics of the optical system including the above mentioned objective lens may become unstable.

Further, since replacement of the diffraction grating will take some time, when, for instance, recording and reproducing information to and from a phase-change type information recording medium is repeated one after the other, it will give rise to the problem of responsiveness in that recording and reproduction of information may not be carried out rapidly.

OBJECTIVES AND SUMMARY OF THE INVENTION

The present invention is made to overcome such conventional problems and holds an objective to provide a variable optical element that allows appropriate recording and reproducing of information to and from an information recording medium, an apparatus having such a variable optical element, and an information recording/reproducing apparatus having such a pickup apparatus.

Additionally, if a crosstalk cancellation technique is applied, it is another objective of the present invention to provide, a variable optical element that provides for performing information recording and reproducing with compatible with both a phase-change type information recording medium and a reproduction-only information recording medium, a pickup apparatus, and an information recording/reproducing apparatus.

In a first aspect of the invention, a variable optical element takes the structure wherein the first area having a piezo-electric medium layer with a piezo-electric effect and the second area that does not have the piezo-electric layer are formed on the top surface of a reference medium and imparts optical changes to the wave front of the light incident on the first and the second areas and reflects it based upon changes in the optical characteristics of the first and the second areas which are caused by the piezo-electric effect of the piezo-electric medium layer.

In a second aspect of the invention, a variable optical element comprises a piezo-electric medium layer with a piezo-electric effect, which has at least a first area and a second area with different thicknesses, and which imparts optical changes to the wave front of the light incident on at least the first and the second areas and reflects it based upon changes in optical characteristics which are caused by the piezo-electric effect of the piezo-electric medium layer of at least the first and the second areas.

According to the first or the second aspect of the invention, when a piezo-electric medium layer is distorted by the piezo-electric effect, optical characteristics of the first and the second areas are changed, a variable optical element causes optical changes to the wave front of the light incident on the first and the second areas and reflects it. Thus, by controlling the piezo-electric effect of a piezo-electric layer, various changes can be imparted to the incident light, which, for example, allows such effects as the appropriate control of the optical characteristics of a light beam irradiated onto an information recording medium for the purpose of recording or reproducing information.

In a third aspect of the invention, the variable optical element according to the first or the second aspect further has a plurality of pairs of the first and the second areas formed in a cyclic manner.

The variable optical element with such a structure also causes optical changes to the wave front of the light incident on the first and the second areas and reflects it when a piezo-electric medium layer is distorted by the piezo-electric effect, the optical characteristics of the first and the second areas are changed. Based on this behavior, by controlling the piezo-electric effect of a piezo-electric layer, various changes can be imparted to the incident light, which, for example, allows such uses as to appropriately control the optical characteristics of light beam irradiated onto an information recording medium for the purpose of recording or reproducing information.

In a fourth aspect of the invention, the piezo-electric medium layer of the variable optical element according to the first or the third aspect above changes in thickness as a result of the piezo-electric effect corresponding to voltages externally applied and alters the diffraction efficiency for the light incident on the first and the second areas based upon phase changes in the first and second areas which are imparted by the changes in thickness.

The variable optical element with such a structure also causes optical changes to the wave front of the light incident on the first and the second areas and reflects it when a piezo-electric medium layer is distorted by the piezo-electric effect, the optical characteristics of the first and the second areas are changed. Based on this behavior, by controlling the piezo-electric effect of a piezo-electric layer with electricity, various changes can be made to the incident light, which, for example, allows such uses as to the appropriate control of the optical characteristics of a light beam irradiated onto an information recording medium for the purpose of recording or reproducing information.

In a fifth aspect of the invention, a pickup apparatus which comprises the variable optical element according to the fourth aspect, irradiates a light beam for recording information onto an information recording medium or a light beam for reproducing information from an information recording medium onto the information recording medium, wherein a light source that emits light toward the first and the second areas of the variable optical element, and an optical system to generate the light beam for recording information or the light beam for reproducing information based upon diffracted and non-diffracted light rays that are caused when the variable optical element diffracted the light emitted against it are applied.

In the pickup apparatus of the invention having such a structure, based upon diffracted and non-diffracted light rays that are effected when a variable optical element diffracts the light emitted from a light source, an optical system generates a light beam for recording information or a light beam for reproducing information to irradiate it onto an information recording medium. Based on this, by controlling an electric field or a voltage to be applied on a variable optical element, for example, it is possible to generate a light beam having power suitable for recording information on an information recording medium or a light beam having power suitable for reproducing information from an information recording medium. In a sixth aspect of the invention, the pickup apparatus according to the fifth aspect further has a photodetector to detect reflected light which is effected when the information recording medium reflects the light beam.

In the pickup apparatus with such a structure, the photodetector detects reflected light, which is originally a light beam for recording information irradiated to an information recording medium and thereby reflected by it, and the photodetector provides for the generation of control signals for processing an appropriate recording of information based on the results of detection. In addition, this photodetector detects reflected light, which is originally a light beam for reproducing information irradiated to an information recording medium and thereby reflected by it, and the photodetector provides for the generation of control signals for processing appropriate information reproduction based on the results of detection.

In a seventh aspect of the invention, an information recording/reproducing apparatus contains the pickup apparatus according to the sixth aspect above and, has a means to control at least the voltages applied to the piezo-electric medium layer between the power of the light emitted from the light source and the voltages applied to the piezo-electric medium layer.

In an eighth aspect of the invention, the control means of the information recording/reproducing apparatus according to the seventh aspect above, at least when recording information to the information recording medium with the light beam for recording information, controls the diffraction efficiency so that the light beam power of the diffracted light assumes a level that does not erase information on the information recording medium by setting the voltage applied to the piezo-electric medium layer to a predetermined voltage level.

According to the information recording/reproducing apparatus in the seventh or eighth aspect, it is possible to variably control the diffraction efficiency of a variable optical element by adjusting the voltages applied to a piezo-electric medium layer. Based on this, it is possible to eliminate problems where information on an information recording medium is unnecessarily erased by appropriately adjusting the power of the light beam for recording information to or reproducing information from an information recording medium.

In a ninth aspect of the invention, the information recording/reproducing apparatus according to the eighth aspect further contains a crosstalk canceller circuit that suppresses crosstalk components based on the information output by the photodetector while it detects the reflected light.

An information recording/reproducing apparatus having such a construction provides for the reproduction of information with suppressed crosstalk components based on the detected results detected by the photodetector while reproducing information.

BRIEF DESCRIPTION OF THE DRAWINGS

FIG. 2A through FIG. 2D are views showing a structure of a variable optical element according to the present embodiment of the invention;

DETAILED DESCRIPTION OF THE PREFERRED EMBODIMENTS

In the following, preferred embodiments of a variable optical element, a pickup apparatus, and an information recording/reproducing apparatus according to the present invention will be described with reference to the drawings.

Figure 1:
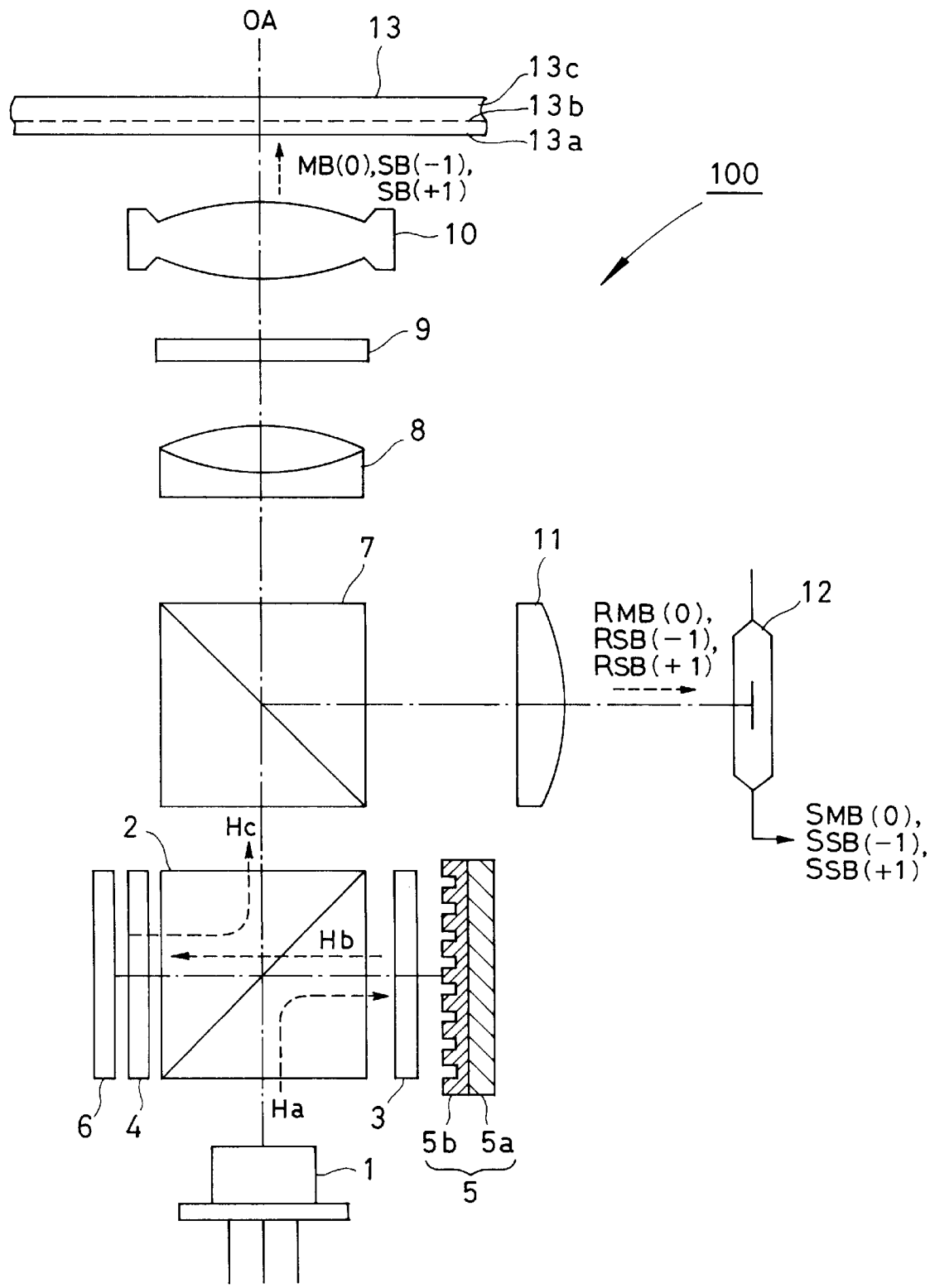
FIG. 1 is a view showing a construction of a pickup apparatus according to the present embodiment of the invention.
Figure 3A:
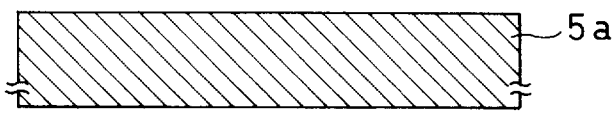
FIG. 3A through FIG. 3G are view showing a production method for a variable optical element according to the present embodiment of the invention.
Figure 3B:
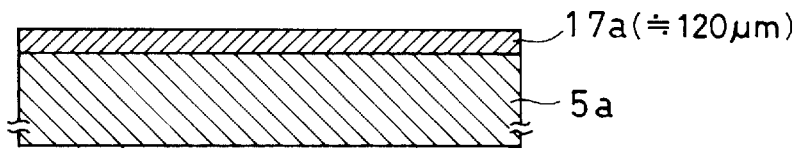
Figure 3C:
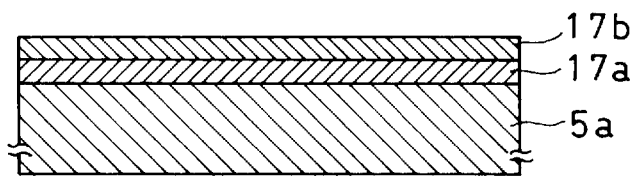
Figure 3D:
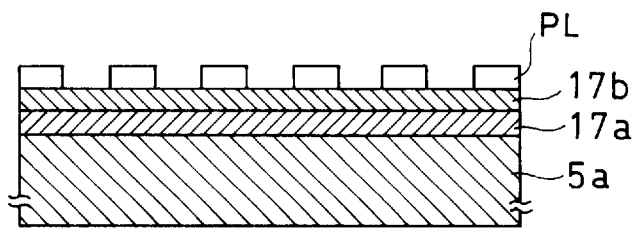
Figure 3E:
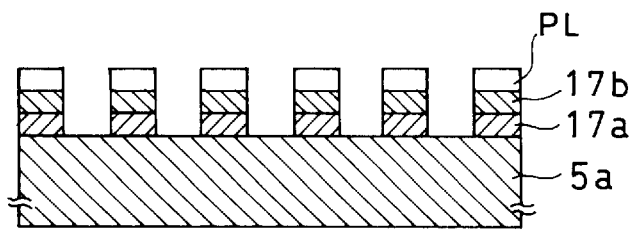
Figure 3F:
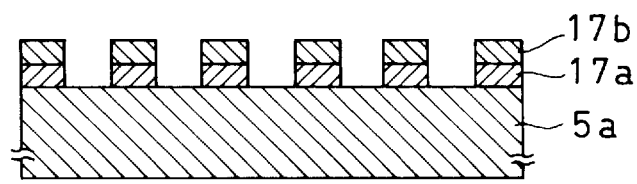
Figure 3G:
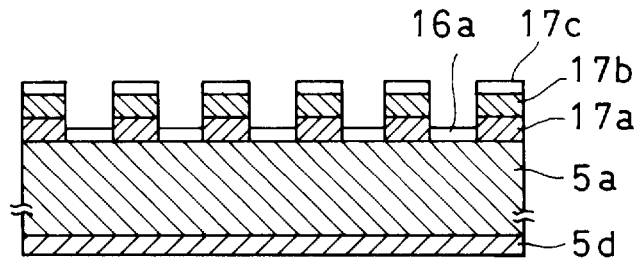
Figure 4:
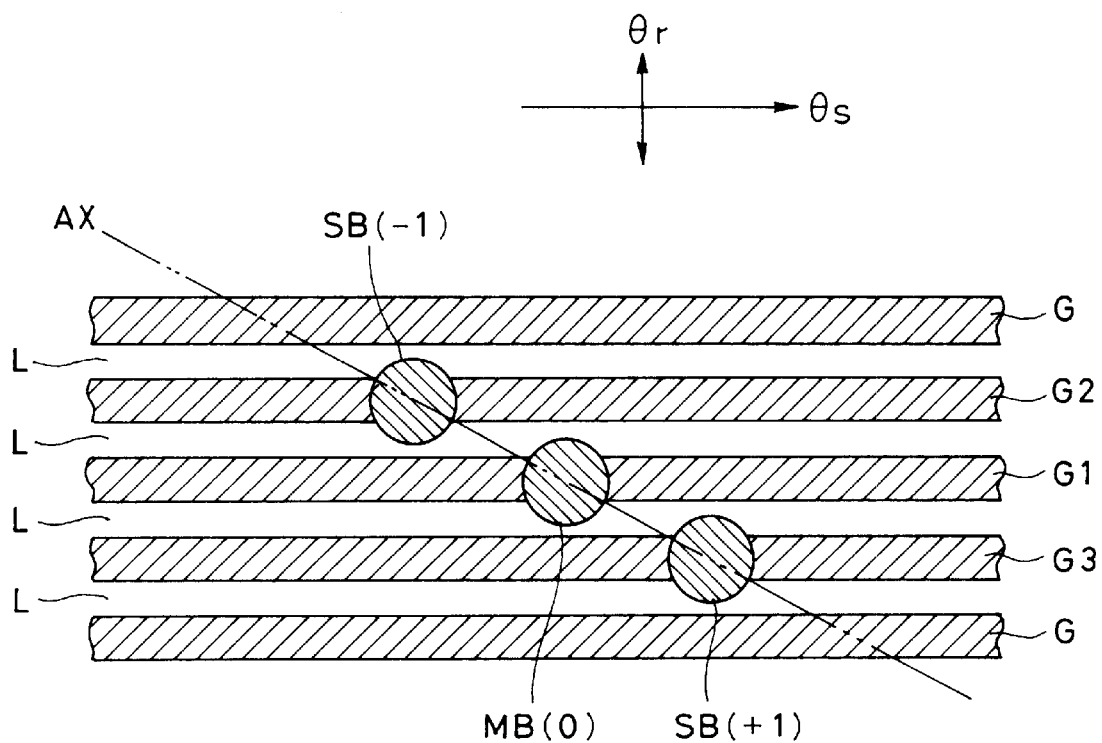
FIG. 4 is a view for explaining operation of a pickup apparatus and an information recording/reproducing apparatus according to the present embodiment of the invention.
Figure 5:
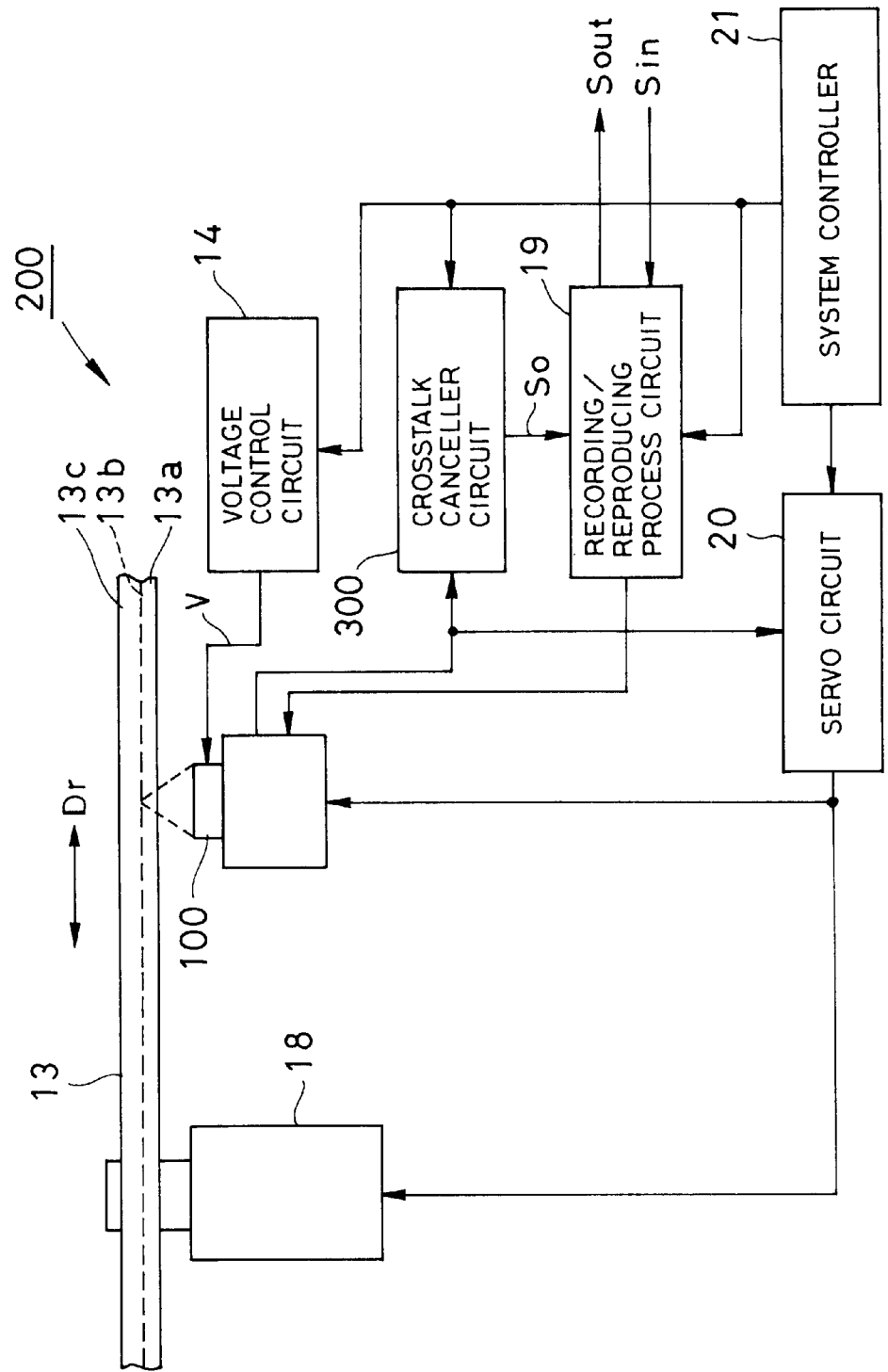
FIG. 5 is a block diagram showing a construction of an information recording/reproducing apparatus according to the present embodiment of the invention.
Figure 6:
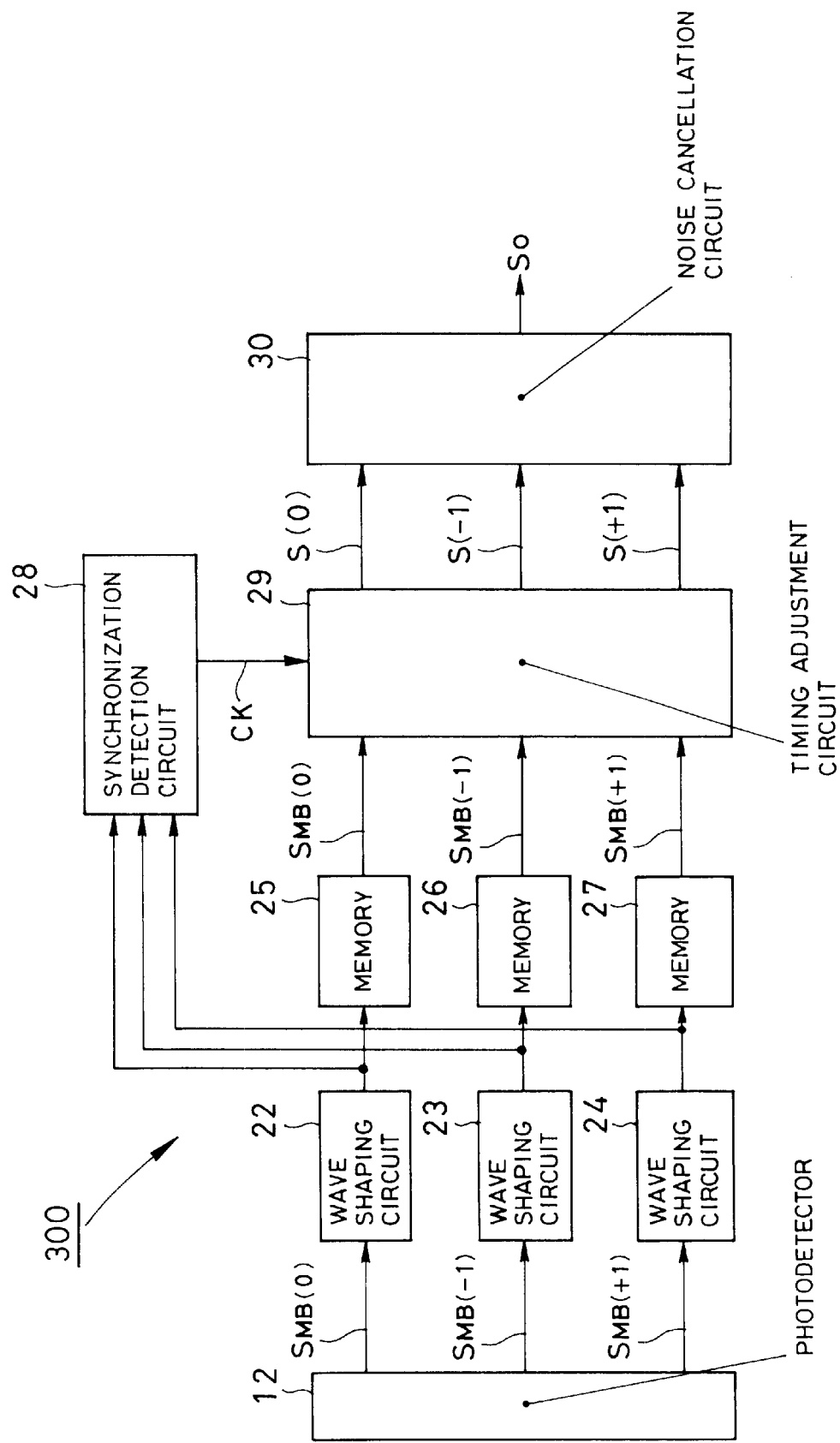
FIG. 6 is a block diagram showing a construction of a crosstalk canceller circuit provided in an information recording/reproducing apparatus.

FIG. 1 is a constructional view showing a construction of a pickup apparatus, FIG. 2 are views showing a structure of a variable optical element, FIG. 3 are views showing a production method of a variable optical element, FIG. 4 is a view for explaining operation of a variable optical element and a pickup apparatus, FIG. 5 is a block diagram showing a construction of an information recording/reproducing apparatus, and FIG. 6 is a block diagram showing a structure of a crosstalk canceller circuit provided in an information recording/reproducing apparatus.

In FIG. 1, the pickup apparatus 100 comprises: a light source 1 which emits a laser beam Ha, a first beam splitter 2, quarter wavelength plates 3 and 4 which are positioned so that each of them faces one of two sides of the first beam splitter 2, a variable optical element 5 positioned to face the outside of the quarter wavelength plate 3, a reflector 6 positioned to face the outside of the quarter wavelength plate 4, a second beam splitter 7, a collimating lens 8, a quarter wavelength plate 9, an objective lens 10 positioned to face an information recording medium 13, a condenser lens 11, and a photodetector 12, wherein these constituent elements 1 to 12 are disposed along an optical axis OA.

The light source 1, containing a semiconductor laser (not illustrated) pointed along the optical axis OA, emits the linear-polarized laser beam Ha from the semiconductor laser to the first beam splitter 2.

The laser beam Ha, which is emitted from the light source 1, is reflected by the first beam splitter 2, then transmitted through the quarter wavelength plate 3 to be made incident onto the variable optical element 5, and further reflected by the variable optical element 5. The reflected laser beam Hb is transmitted through the quarter wavelength plate 3 again, then transmitted through the first beam splitter 2, further transmitted through the quarter wavelength plate 4 to be made incident onto the reflector 6, and reflected by the reflector 6. The laser beam Hc reflected by the reflector 6 is transmitted through the quarter wavelength plate 4 again, and reflected by the first beam splitter 2 to be emitted to the second beam splitter 7.

In other words, the laser beam Ha emitted from the light source 1 is reflected by the first beam splitter 2 to the quarter wavelength plate 3. Since the laser beam Hb which is made incident onto the first beam splitter 2 from the quarter wavelength plate 3 is transmitted through the quarter wavelength plate 3 twice and returned, it is transmitted through the first beam splitter 2 to enter the quarter wavelength plate 4. Further, since the laser beam Hc which enters the first beam splitter 2 from the quarter wavelength 4 is transmitted through the quarter wavelength plate 4 twice and returned, it is reflected by the first beam splitter 2 to the second beam splitter 7.

The laser beam Hc which is emitted to the second beam splitter 7 from the first beam splitter 2 as described above is transmitted through the second beam splitter 7 to be collimated by the collimating lens 8, then passes through the quarter wavelength plate 9, and is irradiated onto the information recording medium 13 as light beams MB(0), SB(−1), and SB(+1), which are described below, after being converged by the objective lens 10.

In addition, the reflected beams RMB(0), RSB(−1), and RSB(+1), which are respectively generated from the light beams MB(0), SB(−1), and SB(+1) reflected by the information recording medium 13, pass through the objective lens 10, the quarter wavelength plate 9, and the collimating lens 8, and they are further reflected by the second beam splitter 7 and emitted to the condensing lens 11. The condensing lens 11 condenses the beams RMB(0), RSB(−1), and RSB(+1) reflected by the second beam splitter 7, and emits them to the photodetector 12. The photodetector 12 receives the reflected beams RMB(0), RSB(−1), and RSB (+1), and then photo-electrically converts the beams into electric signals $S_{MM(0)}$, $S_{SB(-1)}$, and $S_{SB(+1)}$ respectively to output them.

The variable optical element 5 has a structure as shown in FIG. 2A to FIG. 2D. As shown in the perspective view of the FIG. 2A, its structure is such that a grating portion 5b of a reflective type is formed as one body on a semiconductor substrate 5a which is the reference medium, and an appropriate voltage V is applied by the voltage control circuit 14, between the electrode 5c formed on the grating portion 5b and the electrode 5b formed on the back side of the semiconductor substrate 5a.

Further, as shown in the planar drawing of FIG. 2B, the grating portion 5b is so shaped that a plurality of slit-like rectangular grooves 16 and a plurality of convex portions 17 (hereinafter, referred to as convexities) adjacent to each of the rectangular grooves 16 are formed one by one at a certain pitch distance D in a cyclic manner, thereby the first area having the plurality of convexities 17 and the second area having the plurality of rectangular grooves 16 are formed.

Still further, as shown in the longitudinal section of FIG. 2C (a longitudinal section along X—X indicated in FIG. 2B), each convexity 17 has a layered structure which is formed on the semiconductor substrate 5a and comprised of a piezo-electric element layer 17a, formed by piezo-electric semiconductor having a piezo-electric effect or other piezo-electric media, an electrode layer 17b, and a dielectric reflector layer 17c for reflecting light beams. At the bottom part of each rectangular groove 16, a dielectric reflector layer 16a for reflecting light beams is formed on the semiconductor substrate 5a. In addition, aforementioned electrode 5c is disposed and formed on the top surface of the electrode layer 17b, and an electrode layer 5d is formed on the bottom side of the semiconductor substrate 5a by evaporation.

When a voltage V is applied between the electrode 5c and the electrode layer 5d, piezo-electric semiconductor layer 17a experiences changes in thickness because of the piezo-electric effect corresponding to the electric field caused by the applied voltage V, whereby the height H of the dielectric reflector layer 17c of the convexity 17 which corresponds to the dielectric reflector layer 16a of the rectangular groove 16 as shown in the longitudinal section of FIG. 2D (the longitudinal section of a representative part of FIG. 2C) is changed.

Next, a production method of the variable optical element 5 will be described referring to the sectional views in FIG. 3A through FIG. 3G.

The variable optical element 5 is produced in a semiconductor production process. First, a silicon semiconductor substrate 5a of either a P or N type is prepared (FIG. 3A) and a piezo-electric element layer 17a comprising media with piezo-electric effect such as ZnO, ZnS, CdS, CdTe, InSb, BaTiO3 (barium titanate), and KNaC$_4$H$_4$O$_6$ (Rochelle salt) (FIG. 3B) is formed on the semiconductor substrate 5a by sputtering. Next, a metal electrode layer 17b is deposited on the piezo-electric element layer 17a by sputtering (FIG. 3C). In the present embodiment, the thickness of the piezo-electric element layer 17a is set to approximately 120 μm.

Next, a photoresist pattern PL is patterned on the electrode layer 17b by photolithography (FIG. 3D). At this time, the photoresist pattern PL is patterned so that width of both the rectangular groove 16 and the convexity 17 is ½ of the pitch distance D. In the present embodiment, the pitch distance D is set to approximately 25 μm.

Next, using the photoresist pattern PL as a mask, the electrode layer 17b and the piezo-electric element layer 17a are removed as far as the semiconductor substrate 5a by dry etching (RIE) but leaving the part of the electrode layer 17b and the piezo-electric element layer 17a that is masked by the photoresist pattern (FIG. 3E).

Next, after the photoresist pattern PL is removed by using a remover (FIG. 3F), and an electrode 5c is formed on the electrode layer 17b.

Next, a layer of dielectric reflector is formed on top of the exposed electrode layer 17b and semiconductor substrate 5a by evaporation to form the dielectric reflector layer 16a of the rectangular groove 16 and the dielectric reflector layer 17c of the convexity 17 respectively as shown in FIG. 2C (FIG. 3G). Thus a grating portion 5b is completed.

Finally, a metal electrode layer 5d is formed on the back of the semiconductor substrate 5a by evaporation to complete a variable optical element 5.

The variable optical element 5 produced as described above, according to FIG. 1, is arranged with its grating portion 5b facing the quarter wavelength plate 3 and arranged so that the direction in which the rectangular grooves 16 and the convexities 17 are arrayed is perpendicular to the polarization direction of the laser beam Ha which is made incident through the quarter wavelength plate 3.

Again according to FIG. 1, when the light beam Ha emitted by the light source 1 is made incident onto the variable optical element 5 through the beam splitter 2 and the quarter wavelength plate 3, the variable optical element 5 does not simply reflect the light beam Ha coming from the quarter wavelength plate 3 but diffracts it based on the first order diffraction efficiency n which is determined by the rectangular grooves 16 and the convexities 17 of the grating portion 5b, and emits, to the quarter wavelength plate 3, a 0th order diffracted light, a −1st order diffracted light, and a +1st order diffracted light which are generated by the diffraction. In other words, a laser beam Hi becomes a 0th order diffracted light, a −1st order diffracted light, and a +1st order diffracted light.

Thus, the light beams MB(0), SB(−1), and SB(+1) that are converged by the objective lens 10 to be irradiated to the information recording medium 13 are generated based on the 0th order diffracted light, the −1st order diffracted light, and the +1st order diffracted light. As shown in the plan view of FIG. 4, three beams, namely, the light beam MB(0) (hereinafter referred to as the main beam) generated by the 0th order diffracted light, the light beam MB(−1) (hereinafter referred to as the sub-beam) generated by the −1st order diffracted light, and the light beam MB(+1) (hereinafter referred to as the sub-beam) generated by the +1st order diffracted light, are irradiated onto the information recording medium 13. In addition, the reflected light beams RMB(0), RSB(−1), and RSB(+1), which are generated by reflecting the light beams MB(0), SB(−1), and SB(+1) by the information recording medium 13, are detected by the photodetector 12 shown in FIG. 1.

FIG. 4 shows a case where light beams MB(0), SB(−1), and SB(+1) are irradiated onto a phase-change type disc-shaped information recording medium 13 which has a layered structure consisting of a light-incident layer 13*a*, a recording layer 13*b*, and a substrate 13*c*. The same figure indicates the positions of irradiated beams of MB(0), SB(−1), and SB(+1) with respect to the grooves G and the lands L while recording and reproducing information. In addition, for the convenience of explanation, the groove G1 is shown as corresponding to the main track to and from which information is recorded or reproduced, and the grooves G2 and G3 are shown as corresponding to the adjacent tracks. In addition, with respect to the relative movements the pickup apparatus 100 makes while recording and reproducing information, the direction of linear scanning is indicated as θs and the direction perpendicular to the direction of linear scanning θs (hereinafter, referred to as the radial direction) is indicated as θr.

Now, power values P(0), P(−1), and P(+1) of corresponding light beams MB(0), SB(−1), and SB(+1) are determined according to the first order diffraction efficiency η of the grating portion 5*b* formed on the variable optical element 5. Where the total power Pad of the light beams MB(0), SB(−1), and SB(+1), the power Pa of the laser beam Ha emitted from the light source 1, and the attenuation rate α of the laser beam Ha by the time it reaches the information recording medium 13, the following equations (1), (2), and (3) are provided:

$$P(0) \approx (1-2\times\eta)\times Pad \approx (1-2\times\eta)\times \alpha X\, Pa \quad (1)$$

$$P(-1) \approx \eta \times Pad \approx \eta \times \alpha \times Pa \quad (2)$$

$$P(+1) \approx \eta \times Pad \approx \eta \times \alpha \times Pa \quad (3)$$

In addition, the first order diffraction efficiency η is a coefficient whose value is determined based on the pitch distance D of the rectangular grooves 16 and the convexities 17 formed on the grading 5*b* as shown in FIG. 2B and based on the height H between the dielectric reflector layers 17*c* and 16*a* as indicated in FIG. 2D. Further, since the thickness of the piezo-electric element layer 17*a* changes according to the applied voltage V thereby changing the height H, it becomes possible to change the first order diffraction efficiency η by controlling the applied voltage of V, and thus adjustment of the power values P(0), P(−1), and P(+1) also becomes possible accordingly.

Incidentally, as a result of setting the thickness of the piezo-electric element layer 17*a* to approximately 120 μm and the width of the convexities 17 to a half of the pitch distance D (approximately 25 μm), if the applied voltage V is changed from 0 volts to approximately 60 volts, the height H increase by approximately 15 nm. Based on this, if a blue semiconductor laser is used in the light source, the first order diffraction efficiency η for the laser beam Ha can be changed by approximately 25%.

In the present embodiment of the invention, the power of the so-called main beam is set to 0.5 mW and the sub-beam to 0.1 mW when information is reproduced. In order to achieve such a condition, the diffraction efficiency η is set to approximately 20%. Further, when recording information, the main beam is set to 6 mW and the sub-beams set to around 0.6 mW. To achieve such a condition the diffraction efficiency is set to approximately 10% or less.

Next, referring to FIG. 5 and FIG. 6, a description will be given of a structure of an information recording/reproducing apparatus 200 which uses a pickup apparatus 100 having a variable optical element 5. FIG. 5 is a block diagram showing a construction of an information recording/reproducing apparatus 200, and FIG. 6 is a block diagram showing a structure of a crosstalk canceller circuit 300 provided in an information recording/reproducing apparatus 200.

In FIG. 5, the information recording/reproducing apparatus 200 comprises: a driving motor 18 which rotate an information recording medium 13 while supporting it at the same time, a pickup apparatus 100 as shown in FIG. 1, a voltage control circuit 14 which applies voltage V to the variable optical element 5 provided in the pickup apparatus 100, a crosstalk canceller circuit 300, a recording/reproduction process circuit 19, a servo circuit 20, and a system controller 21.

The recording/reproduction process circuit 19, while recording information, performs such processes as encoding on supplied content signal Sin, supplies it to the light source 1 provided in the pickup apparatus 100, and causes the light source 1 to set the power Pa of the laser beam Ha to the power for recording Paw so as to emit. Additionally, while reproducing information, the recording/reproduction process circuit causes the light source 1 to set the power Pa of the laser beam Ha to the power for reproducing Par so as to emit, performs such process as decoding on read signal So which is read out from an information recording medium 13 and supplied via the crosstalk canceller circuit 300, and generates reproduced signal Sout and outputs it.

The servo circuit 20 controls the rotational speed of the driving motor 18 and causes the pickup apparatus 100 to move at a predetermined linear speed relative to the information recording medium 13 by controlling the carriage mechanism (not illustrated) which moves the pickup apparatus 100 back and forth along the radial direction θr of the information recording medium 13.

In the system controller 21 a microprocessor (MPU) for controlling the entire information recording/reproducing apparatus 200 is provided.

In an information recording/reproducing apparatus 200 having such a structure, if a user inserts a phase-change type information recording medium 13 and issues a command to the system controller 21 to start recording information, the recording of information is started.

While recording information as above, the voltage control circuit 14 applies a predetermined voltage Vw to the variable optical element 5, which sets the grating portion 5*b* to the first order diffraction efficiency ηw for recording information. Further, while the first order diffraction efficiency ηw is set in this state, the recording/reproduction process circuit 19 supplies signals to be recorded onto the light source 1 and causes it to emit the laser beam Ha having the power for recording.

Based on the above, as shown in FIG. 4, the main beam MB(0) is irradiated on the main track G1 and the sub-beams SB(−1) and SB(+1) are irradiated on the adjacent tracks G2 and G3 respectively, and thereby the recording of information by the main beam MB(0) on the track G1 is performed.

In this case, the power Paw of the laser beam Ha and the first order diffraction efficiency ηw of the grating portion 5*b* are determined according to the types of the information recording medium 13.

In other words, where the power which can record information (hereinafter, referred to as recording power) by causing phase changes in the recording layer 13b of the information recording medium 13 is given as Pwt, the power which can erase information already recorded (hereinafter, referred to as erasing power) by causing phase changes in the recording layer 13b of the information recording medium 13 is given as Per, the power of the main beam MB(0) is given as P(0), the power of the sub-beam SB(−1) is given as P(−1), and the power of the sub-beam SB(+1) is given as P(+1), the power Paw of the laser beam Ha is set so that the equations (4) to (8) are satisfied and the first order diffraction efficiency ηw is set by the voltage Vw:

$$Pwt \leq P(0) \quad (4)$$

$$P(-1) < Pes \quad (5)$$

$$P(+1) < Pes \quad (6)$$

$$\eta w < Pes/Pwt \quad (7)$$

$$Paw = \{P(0) + P(-1) + P(+1)\}/\alpha \quad (8)$$

As shown in the above, if the power Paw of the laser beam Ha and the first order diffraction efficiency ηw of the grating portion 5b are set, information can be recorded in the main track G1 with the main beam MB(0) having appropriate power P(0) while preventing the sub-beams SB(−1) and SB(+1) from erasing or destroying information in the adjacent tracks G2 and G3.

Next, if a user mounts a phase-change type information recording medium 13 and issues a command to the system controller 21 to start reproducing information, the reproduction of information is started.

While the information is produced, the voltage control circuit 14 applies a predetermined voltage Vr to the variable optical element 5, whereby it sets the grating portion 5b to the first order diffraction efficiency ηr for reproducing information. While the first order diffraction efficiency ηr is set in this condition the light source 1 is caused to emit the laser beam Ha having the power Pr for reproduction.

Based on the above, as shown in FIG. 4, the main beam MB(0) is irradiated on the main track G1 and the sub-beams SB(−1) and SB(+1) are irradiated on the adjacent tracks G2 and G3 respectively, and thereby read-out of information by the main beam MB(0) from the track G1 is performed.

In this case, the power Par of the laser beam Ha and the first order diffraction efficiency ηr of the grating portion 5b are determined according to the type of the information recording medium 13. In other words, based on the total power Pad (=P(0)+P(−1)+P(+1)) of the beams MB(0), SB(−1), and SB(+1), the erasing power Per, and the power Prd necessary to read out information from the main track G1, the power Par of the laser beam Ha is set so that the equations (8) to (12) below are satisfied and the first order diffraction efficiency ηr is set by the voltage Vr:

$$P(0) \fallingdotseq Prd \quad (8)$$

$$P(-1) < Per \quad (9)$$

$$P(+1) < Per \quad (10)$$

$$\eta r > (1 - Per/Pad)/2 \quad (11)$$

$$Par = \{P(0) + P(-1) + P(+1)\}/\alpha \quad (12)$$

When the power Par of the laser beam Ha and the first order diffraction efficiency ηr of the grating portion 5b are set as shown in the above, information can be reproduced from the main track G1 by the main beam MB(0) while preventing the main beam MB(0) and the sub-beams SB(−1) and SB(+1) from erasing or destroying the information in each track of G1, G2 and G3.

Further, the photodetector 12 receives light reflected beam RB(0) generated by the main beam MB(0) and reflected beams RMB(0), RSB(−1), and RSB(+1) which are generated by the sub-beams SB(−1) and SB(+1), and supplies the electric signals $S_{MB(0)}$, $S_{SB(-1)}$, and $S_{SB(+1)}$ to the crosstalk canceller circuit 300 shown in FIG. 6.

The crosstalk canceller circuit 300 comprises: waveform formation circuits 22, 23, and 24, which shape waveforms of electric signals $S_{MB(0)}$, $S_{SB(-1)}$, and $S_{SB(+1)}$ output from the photodetector 12 into binary logic signals $S_{MB(0)}$, $S_{SB(-1)}$, and $S_{SB(+1)}$; CCD memories 25, 26, and 27 serving as FIFO (first in first out) memories to temporarily store each corresponding signal of $S_{MB(0)}$, $S_{SB(-1)}$, and $S_{SB(+1)}$ after the waveforms thereof have been formed; a synchronization detection circuit 28; a timing adjustment circuit 29; and a noise canceller circuit 30.

Here, the synchronization detection circuit 28 detects the physical address information of the grooves G1, G2, and G3 which are contained in the logic signals $S_{MB(0)}$, $S_{SB(-1)}$, and $S_{SB(+1)}$, and thereby, based on the detected result, judges the delay time τd of the light beam SB(−1) with respect the light beam MB(0) and the lead time τf of the light beam SB(+1) with respect to the light beam MB(0), in the linear scanning direction θr as shown in FIG. 4. The same circuit generates a synchronization signal CK indicating the delay time τd and lead time τf with reference to the light beam MB(0) and supplies it to the timing adjustment circuit 29.

The timing adjustment circuit 29, based on the timing of the synchronization signal CK, reads out the logic signal $S_{MB(0)}$ recorded in the CCD memory 25, and forwards the logic signal $S_{M(0)}$ as the logic signal S(0) to the noise canceller circuit 30. Further, the same circuit reads out the logic signal SSB(−1) from the CCD memory 26 at a timing earlier than the readout timing of the logic signal $S_{MB(0)}$ by the delay time τd, and forwards the logic signal $S_{SB(-1)}$ as the logic signal S(−1) to which timing adjustment has been performed to the noise canceller circuit 30. Further, the same circuit reads out the logic signal $S_{SB(+1)}$ from the CCD memory 27 at a timing later than the readout timing of the logic signal $S_{MB(0)}$ by the lead time τf, and forward the logic signal $S_{SB(+1)}$ as the logic signal S(+1) to which timing adjustment has been performed to the noise canceller circuit 30.

As described above, by forwarding, to the noise canceller circuit 30, the logic signals $S_{MB(0)}$, $S_{SB(-1)}$, and $S_{SB(+1)}$, recorded in the CCD memories 25, 26, and 27 respectively after timing adjustment has been performed based on the delay time τd and the lead time τf, the logic signals $S_{MB(0)}$, $S_{SB(-1)}$, and $S_{SB(+1)}$ including with them the positional information of the grooves G1, G2, and G3 relative to the radial direction θr as shown in FIG. 4 are supplied to the noise canceller circuit 30.

That is, though the light beams MB(0), SB(−1), and SB(+1) are actually shifted in terms of phase in the direction of linear scanning θs, the timing adjustment circuit 29 performs the above described timing adjustment based on the synchronization signal CK, and whereby the logic signals $S_{MB(0)}$, $S_{SB(-1)}$, and $S_{SB(+1)}$ which are obtained, when the light beams MB(0), SB(−1), and SB(+1) are irradiated, seemingly, in the same phase in the direction of linear scanning θs (in other words, their beam spots are aligned in the radial direction θr) are supplied to the noise canceller circuit 39.

The noise canceller circuit 30 generates the readout signal So with the crosstalk component suppressed by canceling out the crosstalk component contained in the logic signal S(0) by logic signals S(−1) and S(+1), and supplies it to the recording/reproduction process circuit 19, thereby generating the reproduced signal Sout which should be originally reproduced.

In addition, when information is reproduced from a non-phase-change type, reproduction-only information recording medium, it is possible to reproduce information in a similar way as described above so as to reproduce information from the phase-change type information recording medium 13 and generate a reproduced signal Sout whose crosstalk component is suppressed.

As described above, the pickup apparatus and an information recording/reproducing apparatus of the present embodiment contains a variable optical element 5 whose first order diffraction efficiency η changes according to the applied voltages V and the first order diffraction efficiency η is adjusted depending on when information is recorded and when information is reproduced. Thereby, for recording of information, while adjacent tracks G2 and G3 of the information recording medium 13 are irradiated with sub-beams SB(−1) and SB(+1) having such low power P(−1) and P(+1) as not to erase or destroy information, by a main beam MB(0) having appropriate power, information is recorded on the main track G1.

In other words, the variable optical element 5 has a characteristic in which its first order diffraction efficiency η is changed according to the applied voltages V. When the applied voltage V is lowered, the first order diffraction efficiency η is decreased, and when the voltage V is raised, the first order diffraction efficiency η is increased. In turn, when the first order diffraction efficiency η is lowered, power of the −1st order diffracted light and +1st order diffracted light is reduced and, relatively, the power of the 0th order diffracted light is increased. On the other hand, when the first order diffraction efficiency η is raised, power of the −1st order diffracted light and the +1st order diffracted light is increased and, relatively, power of the 0th order diffracted light is reduced.

Therefore, when information is recorded, a low voltage Vw for recording is used to control the first order diffraction efficiency η, whereby the power of the −1st order diffracted light and +1st order diffracted light is lowered and accordingly, it becomes possible to increase the power of the 0th order diffracted light, and thus the power of the main beam MB(0) can be set to a level suitable for recording information and the sub-beams SB(−1) and SB(+1) can be set to a low level which does not cause erasure or destruction of the information.

On the other hand, when information is reproduced, by irradiating the main beam MB(0) and sub-beams SB(−1) and SB(+1) respectively having such low power levels P(0), P(−1), and P(+1) as not to erase or destroy information are, respectively, irradiated onto the main track G1 and sub-tracks G2 and G3 of the information recording medium 13, the main beam MB(0) having appropriate power P(0) can be used to reproduce information from the main track G1. In particular, since this method does not erase or destroy any information recorded in the adjacent tracks G2 and G3, a crosstalk cancellation technique can be effectively used.

In other words, as described above, the variable optical element 5 has a characteristic where it changes the first order diffraction efficiency η corresponding to the applied voltage V, thereby changing the power of the −1st order diffracted light and the +1st order diffracted light relatively to the power of the 0th order diffracted light, and therefore, when information is reproduced, by controlling so that the first order diffraction efficiency η is increased by a high voltage Vr for reproduction, it becomes possible to raise the power of the −1st order diffracted light and the +1st order diffracted light and to lower the power of the 0th order diffracted light accordingly. Thus, appropriately controlling the first order diffraction efficiency η makes it possible to set the power of the main beam MB(0) and the sub-beams SB(−1) and SB(+1) to an appropriate power which does not erase or destroy information and to reproduce the information.

In addition, by adjusting the first order diffraction efficiency η of the variable optical element 5, depending on the cases where information is recorded to and reproduced from, a phase-change type information recording medium and where information is reproduced from a non-phase-change, reproduction-only type information recording medium, it is easy to generate the main beam MB(0) and sub-beams SB(−1) and SB(+1) having an appropriate power for each type of information recording media. Therefore, this adjusting makes it possible to provide a pickup apparatus and an information recording/reproducing apparatus with high compatibility.

In addition, since the piezo-electric element layer 17b of the variable optical element 5 has a characteristic such that it rapidly changes its thickness according to the applied voltage V (characteristic of distortion), it provides for recording of information and reproducing of information can be performed with high responsiveness even when recording and reproducing are switched one after the other.

In addition, in the present embodiment, descriptions thus far are provided in the case where a variable optical element 5 is used as a reflective grating for generating a main beam MB(0) and sub-beams SB(−1) and SB(+1) having appropriate power levels, however, this variable optical element 5 may be used as an optical modulation element for other purposes. Further, in the present embodiment, as shown in FIG. 1, the variable optical element 5 is arranged to be perpendicular to the incident-light beam Ha, however, it may be arranged diagonally depending on the optical system and used.

In the preferred embodiments of the invention thus far, descriptions are provided in the case where only one layer of piezo-electric element 17a is formed in convexities 17 of the variable optical element 5. However, as shown in the longitudinal section of FIG. 7, a piezo-electric layer 17a' and an electrode layer 17b' can further be formed between the electrode layer 17b and the dielectric reflector layer 17c, thereby applying a first applied voltage V1 between the electrode layers 17b' and 17b and a second applied voltage V2 between the electrode layers 17b and 15d. In such a structure, because the thickness of the piezo-electric element layers 17a and 17a' can be changed to a greater degree according to the applied voltages V1 and V2, the first order diffraction efficiency η can be controlled in a wider range, thus providing for recording and reproducing information to and from a greater variety of information recording media. For example, it becomes possible to perform recording and reproducing information to and from an information recording media with one recording layer and a multi-layered information recording media with multiple recording layers using the same pickup apparatus. Further, it becomes possible to rapidly switch between recording to and reproducing from one of the multiple recording layers and recording to and reproducing from the rest of the multiple recording layers of the same information recording media.

Figure 7:
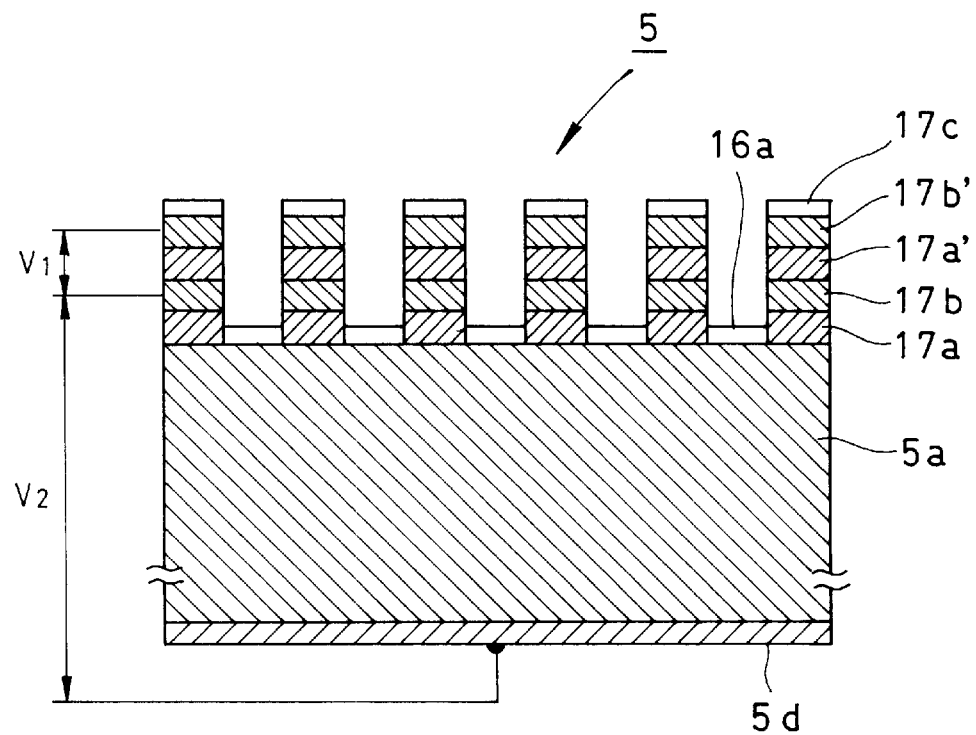
FIG. 7 is a sectional view showing another structure of a variable optical element.

In addition, the piezo-electric element layer 17a' and electrode layer 17b' shown in FIG. 7 can be further added in a greater number of pairs to allow control of the first order diffraction efficiency η over a much greater range.

Figure 8:
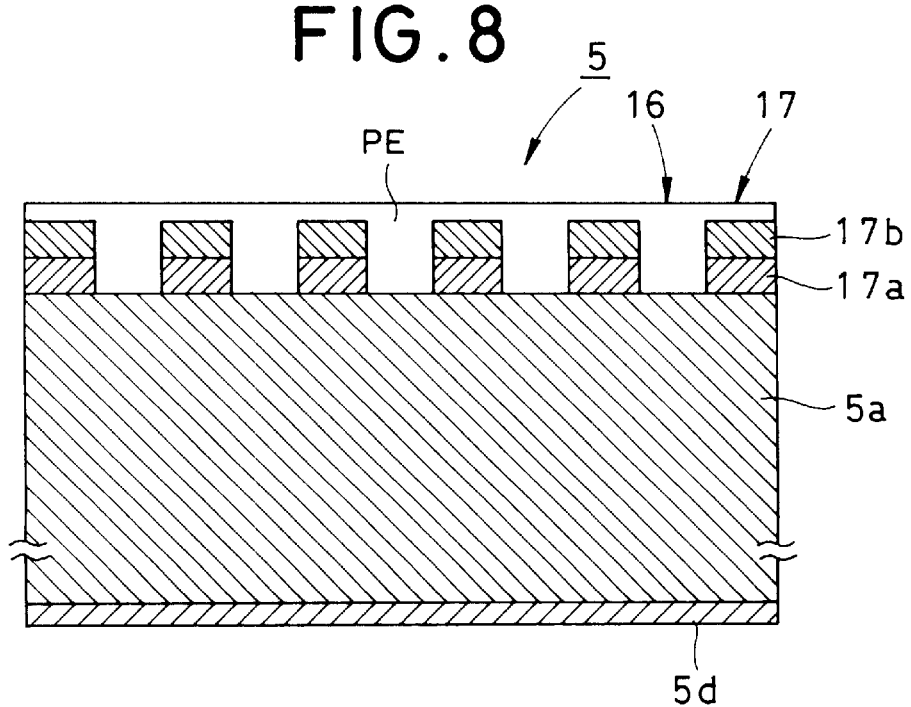
FIG. 8 is a sectional view showing yet another structure of a variable optical element.

Further, in the variable optical element 5 shown in FIG. 2A through FIG. 2D and FIG. 7, dielectric reflector layers 16a and 17c are provided to reflect light, however, as shown in FIG. 8, it is possible to coat a transparent media PE over the electrode layer 17b of the convexities 17 and the upper surface of the semiconductor substrate 5a serving as rectangular grooves 16 by spin coating so as to fill the rectangular grooves 16 with this media PE. Having such a structure allows switching between two states where the first order diffraction does not occur and where the first order diffraction occurs depending on the applied voltage V, thus achieving a variable optical element having the same function as the variable optical element 5 as shown in FIG. 2A through FIG. 2D and FIG. 7.

Figure 9:
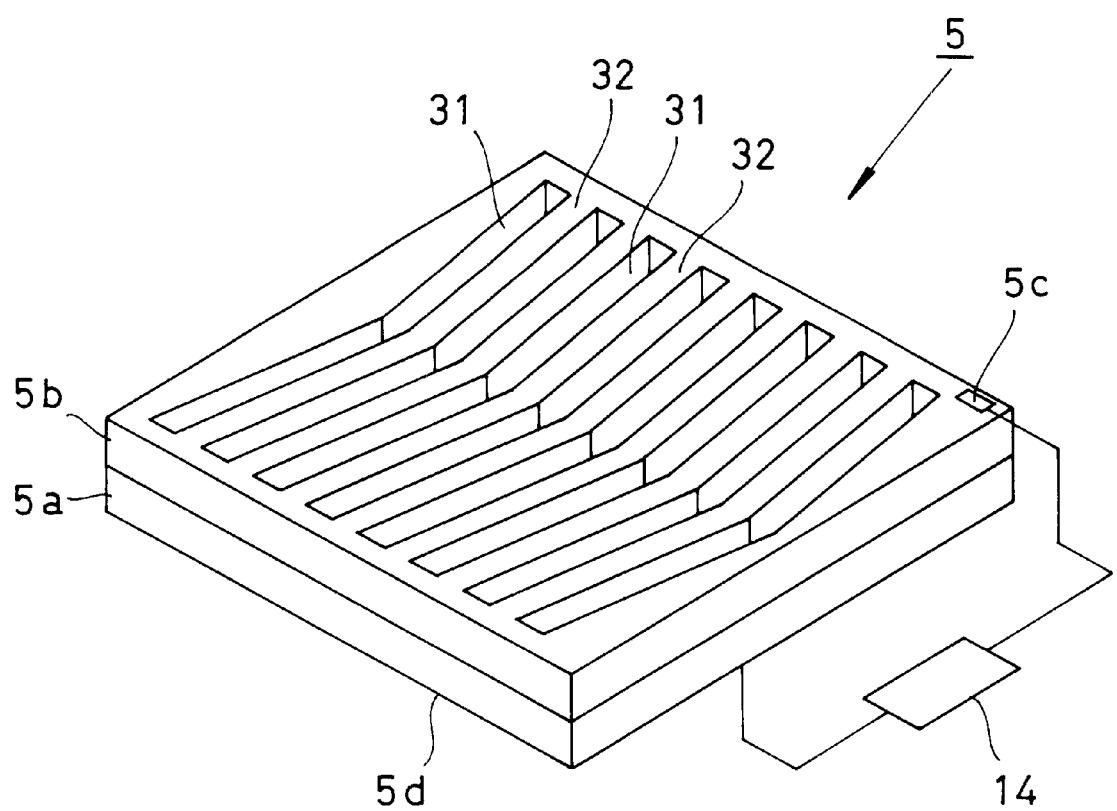
FIG. 9 is a sectional view showing yet another structure of a variable optical element.

Further, the variable optical element 5 shown in FIG. 2A through FIG. 2D is presented as having the grating portion 5b consisting of narrow rectangular-shaped grooves 16 and convexities 17 which are implemented one by one in a cyclic manner. However, without being limited to such a structure, the grating portion 5b can have a structure as shown in the perspective view of FIG. 9 where bent line-shaped grooves 31, which follow the wave front to be given to diffracted light, and convexities 32 are implemented one by one in a cyclic manner.

Figure 10:
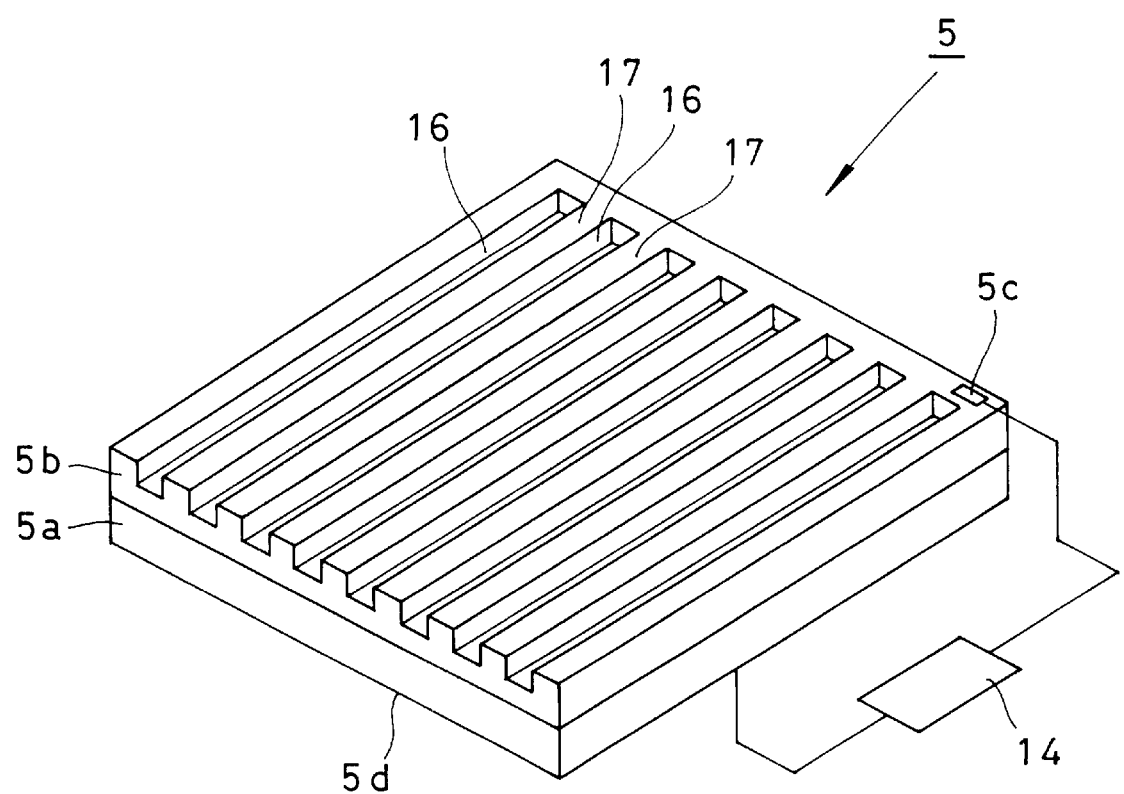
FIG. 10 is a sectional view showing yet another structure of a variable optical element.

In addition, the variable optical element 5 shown in FIG. 2A through FIG. 2D is presented as having the grating portion 5b with rectangular-shaped grooves 16 which are surrounded by the portion of the same convexities as the convexities 17. However, without being limited to such a structure, a portion of the convexities may be so formed that they collectively take a shape like a comb which defines rectangular grooves 16 and convexities 17 as shown in the perspective view of FIG. 10.

Figure 11:
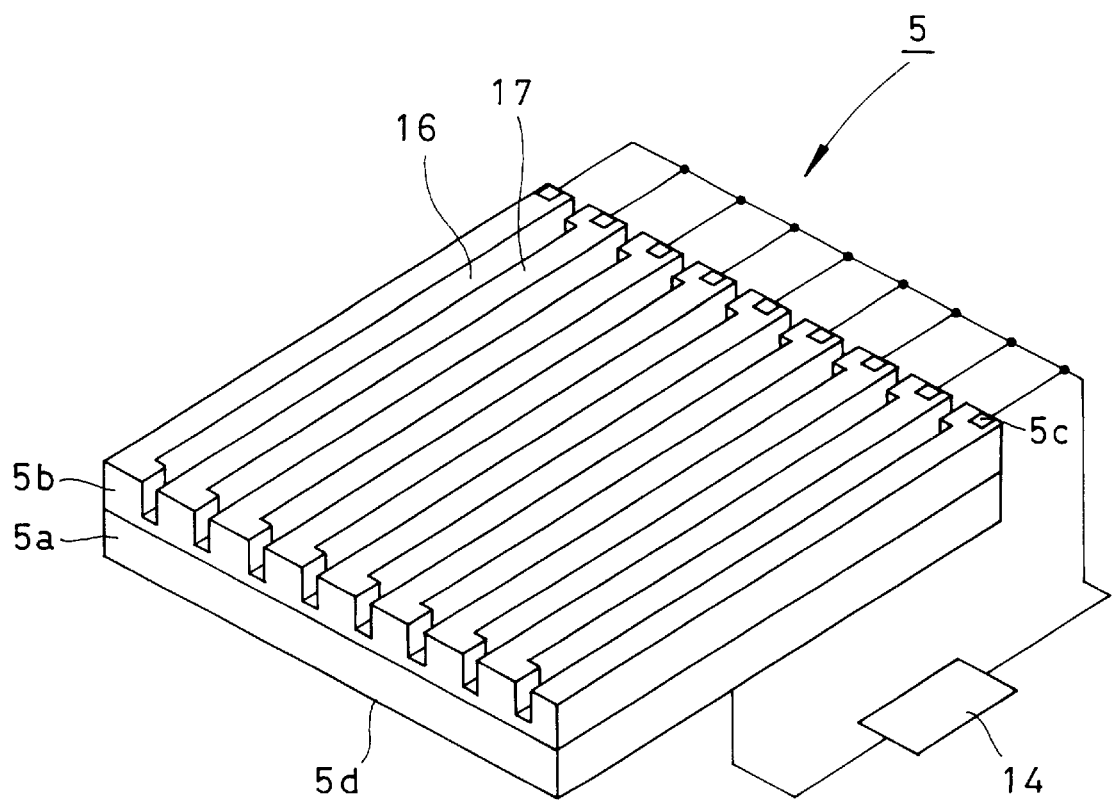
FIG. 11 is a sectional view showing yet another structure of a variable optical element.

In addition, as shown in the perspective view of FIG. 11, each of the convexities 17 may be separated and have an electrode formed in them, to which applied voltage V may be applied. However, in FIG. 11, instead of applying a common applied voltage V to all of the convexities 17, voltages may be applied independently to individual convexities 17. Because, if voltages are applied independently, the thickness of each convexity 17 can be controlled independently, and variable optical elements with diverse optical characteristics can be achieved.

Further, as shown in FIG. 3A through FIG. 3G, the variable optical element 5 has a structure where a piezo-electric element layer 17a and a reflector layer 17c are formed in the convexities 17 and only a reflector layer 16a is formed in the rectangular grooves 16. However, the present invention is not limited to such a structure.

Figure 12A:
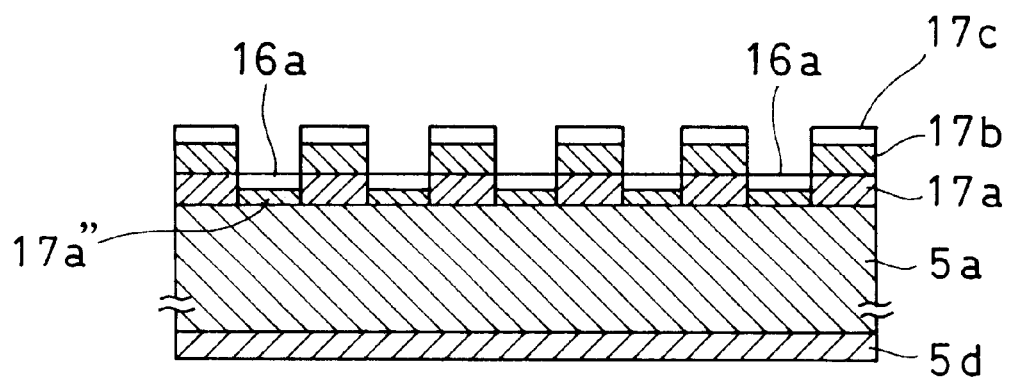
FIG. 12A and FIG. 12B are sectional views showing still other structures of a variable optical element.

As a modified example, as shown in FIG. 12A, the piezo-electric element layer 17a″ which has less thickness than a piezo-electric element layer 17a may be formed. By forming a reflector layer 16a on top of 17a″, rectangular grooves 16 may be formed which are lower in height than convexities 17.

Even though such a structure can be achieved by such techniques as photolithography, etching, sputtering, and gas phase growth method, for example, by reducing the amount of etching in the areas of the piezo-electric element layer 17a which correspond to the rectangular grooves 16 during the etching process as shown in FIG. 3E, portions having a thin layer of piezo-electric element remains which can be used as the piezo-electric element layer 17a″ of a lesser thickness.

Wiring can be formed to individually connect the thin piezo-electric element layer 17a″ and the thick piezo-electric element layer 17a to apply different voltages to each wiring for controlling the amount of distortion caused in each layer. Or common wiring can be formed to connect both the thin piezo-electric element layer 17a″ and the thick piezo-electric element layer 17a, which allows control of the varied amounts of distortion between the layers of different thickness even though the voltage applied may be the same.

Figure 12B:
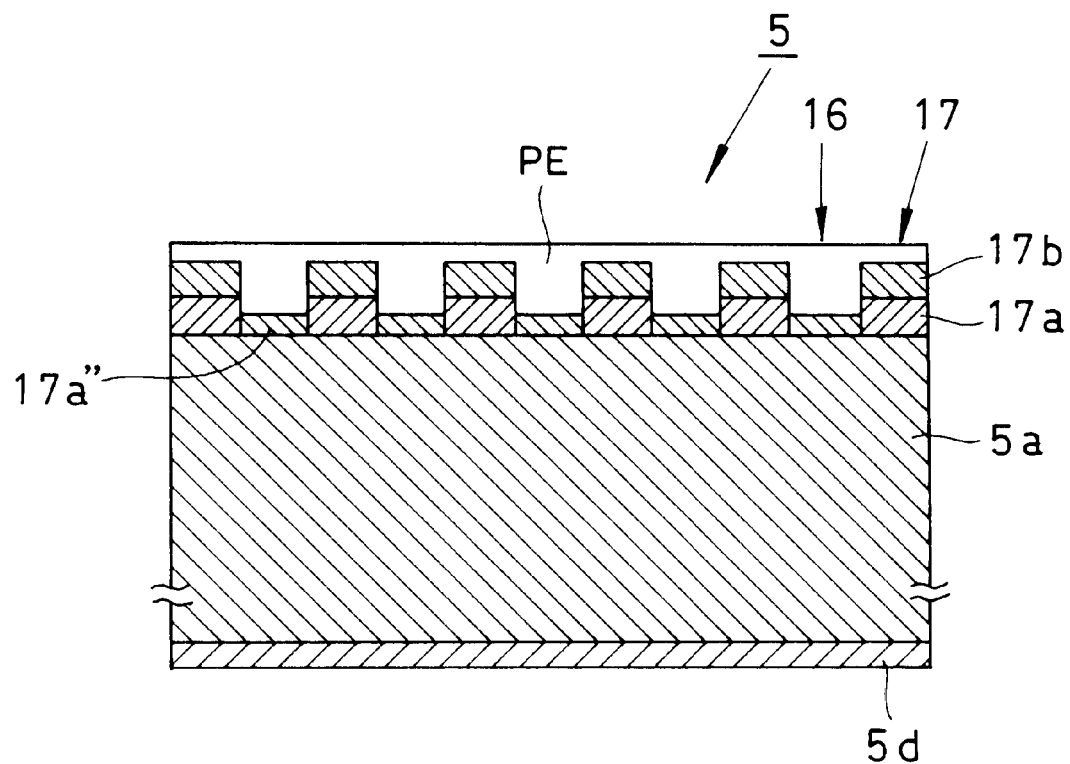
Figure 13:
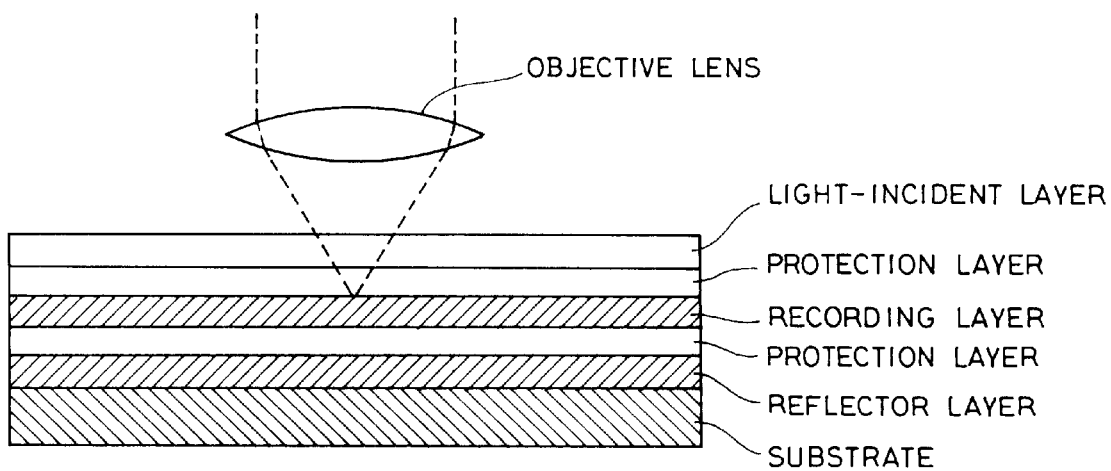
FIG. 13 is a sectional view schematically showing a structure of an information recording medium.

Further, as a modified example of a variable optical element 5 shown in FIG. 8, in a similar manner as employed for the structure in FIG. 12A a piezo-electric element layer 17a″ having a lesser thickness than a piezo-electric element layer 17a is formed in the rectangular grooves 16 and then the whole side may be covered with a transparent media PE as shown in FIG. 12B. Such a structure of FIG. 12B can be achieved in a similar way as the case of FIG. 12A by appropriately controlling the amount of etching.

Additionally, in a structure shown in FIG. 12B, wiring can be formed individually to each of the piezo-electric element layers 17a and 17a″ for independent voltage control. Also, common wiring can be formed to both piezo-electric element layers 17a and 17a″ to apply the same voltage. In other words, the amount of distortion can be controlled according to the difference in thickness between the piezo-electric element layers 17a and 17a″ even though the control voltage is the same for both. In addition, if a common control voltage is applied, it can be structured so that transparent electrodes (ITO) are formed as a transparent medium PE and a common control voltage is applied to the transparent electrodes.

As has been described, a variable optical element of the present invention is given a structure such that, when light is incident on the first and the second areas, it reflects the light imparting optical changes to its wave front based on changes in the optical characteristics of the first and the second areas caused by the piezo-electric effect of the piezo-electric medium layer. Therefore, by controlling the piezo-electric effect of the piezo-electric medium layer it becomes possible to impart various optical changes to the incident light. This can be used, for example, to appropriately control optical characteristics of light beams irradiated onto an information recording medium for the purpose of recording or reproducing information.

In addition, a pickup apparatus of the present invention is provided with a light source which emits light onto the first and the second areas of a variable optical element, and an optical system which generates light beams for recording information and light beams for reproducing information based on diffracted light caused when the light is diffracted by the variable optical element and nondiffracted light. Therefore, for example, by controlling the voltage applied on the variable optical element, it is possible to generate light beams having a power appropriate for recording information on an information recording medium, that is, a power which will not erase or destroy any information already recorded on the information recording medium, and it is also possible to generate light beams having power appropriate for reproducing information from an information recording medium, that is, a power which will not erase or destroy any information already recorded on the information recording medium.

In addition, an information recording/reproducing apparatus of the present invention is enabled, by containing a pickup apparatus which has a variable optical element, to detect a light beam with a photodetector wherein the light beam is first irradiated onto an information recording medium for recording information then reflected by the information recording medium, and then based on the result of detection it can generate control signals, such as a tracking error signal for example, for performing an appropriate information recording process. In such a case, it can generate light beams for recording information having a power which will not cause erasure or destruction of information already recorded on the information recording medium. Further, it is enabled to detect a light beam with a photodetector wherein the light beam is first irradiated onto an information recording medium for reproducing information then reflected by the information recording medium and then, based on the result of detection, it can generate control signals for performing an appropriate information reproduction process. In this case also, it can generate light beams for reproducing information having a power which will not cause erasure or destruction of information already recorded on the information recording medium. Additionally, it can reproduce information with its crosstalk component suppressed based on the result detected by the photodetector.

Further, according to the variable optical element, pickup apparatus, and information recording/reproducing apparatus, because a light beam appropriate for each type of information recording media can be generated depending on when information is recorded to and reproduced from a phase-change type information recording medium or when information is reproduced from a non-phase-change, reproduction-only type information recording medium, advantageous effects can be attained such that a highly compatible pickup apparatus and information recording/reproducing apparatus can be provided.

What is claimed is:

1. A pickup apparatus which irradiates a light beam for recording information on an information recording medium and/or a light beam for reproducing information from an information recording medium on said information recording medium, comprising:

a variable optical element having at least one of a first area and a second area of a piezo-electric medium layer with a piezo-electric effect, wherein optical changes are imparted to the wave front of light made incident on at least said first and said second areas to reflect the light based on changes in optical characteristics which are caused by the piezo-electric effect of the piezo-electric medium layer of at least said first and said second areas, and wherein said piezo-electric medium layer changes in the thickness as a result of said piezo-electric effect corresponding to voltages externally applied, and wherein diffraction efficiency is changed for the light made incident on said first and said second areas based on phase changes in said first and said second areas due to said changes in thickness;

a light source to emit light to said first and said second areas of said variable optical element; and an optical system to generate the light beam for recording information or the light beam for reproducing information based on diffracted and not-diffracted light rays that are caused when said variable optical element diffracts said light.

2. A pickup apparatus according to claim 1, wherein the first area including a piezo-electric medium layer having a piezo-electric effect, and the second area no including any piezo-electric medium layer, which are formed on the top surface of a reference medium.

3. A pickup apparatus according to claim 1, wherein the first and the second areas are different in thickness.

4. A pickup apparatus according to claim 1, wherein a plurality of pairs of said first and said second areas are formed one after another in a cyclic manner.

5. A pickup apparatus according to claim 1, further comprising a photodetector to detect reflected light which is generated when said information recording medium reflects said light beam.

6. An information recording/reproducing apparatus which is equipped with a pickup apparatus according to claim 5, wherein a means is provided to control at least the voltages applied to said piezo-electric medium layer among the power of said light emitted from said light source and the voltages applied to said piezo-electric medium layer.

7. An information recording/reproducing apparatus according to claim 6, wherein, at least when recording information onto the information recording medium with said light beam for recording information, said control means controls said diffraction efficiency so that the light beam power of said diffracted light assumes a level that will not erase information on said information recording medium by setting the voltage applied to said piezo-electric medium layer to a predetermined voltage level.

8. An information recording/reproducing apparatus according to claim 7, further comprising a crosstalk canceller circuit that suppresses crosstalk components based on the information output by said photodetector while it detects said reflected light.

* * * * *